United States Patent
Morelle et al.

(10) Patent No.: US 9,900,393 B2
(45) Date of Patent: Feb. 20, 2018

(54) SYSTEMS AND METHODS FOR DYNAMICALLY MANAGING CAPABILITIES ON NETWORK MONITORING DEVICES

(71) Applicant: VeEx Inc., Fremont, CA (US)

(72) Inventors: Cyrille Morelle, Los Altos, CA (US); Paul Ker Chin Chang, Fremont, CA (US)

(73) Assignee: VeEX Inc., Fremont, CA (US)

(*) Notice: Subject to any disclaimer, the term of this patent is extended or adjusted under 35 U.S.C. 154(b) by 868 days.

(21) Appl. No.: 14/150,483

(22) Filed: Jan. 8, 2014

(65) Prior Publication Data
US 2015/0195139 A1 Jul. 9, 2015

(51) Int. Cl.
*H04L 29/08* (2006.01)
*H04L 12/24* (2006.01)

(52) U.S. Cl.
CPC ......... *H04L 67/22* (2013.01); *H04L 41/0853* (2013.01)

(58) Field of Classification Search
CPC .... H04L 41/0853; H04L 67/22; H04M 15/41; H04M 15/42; H04M 15/43; H04M 15/44; H04M 15/53; H04M 15/61; H04M 15/80; H04W 8/22
See application file for complete search history.

(56) References Cited

U.S. PATENT DOCUMENTS

| | | | |
|---|---|---|---|
| 7,020,700 B1* | 3/2006 | Bennett | H04L 63/0281 709/223 |
| 2010/0332906 A1* | 12/2010 | Agrawal | H04L 41/0631 714/37 |
| 2014/0098671 A1* | 4/2014 | Raleigh | H04M 15/80 370/235 |
| 2015/0181415 A1* | 6/2015 | Raleigh | H04W 8/22 455/418 |

* cited by examiner

*Primary Examiner* — Azizul Choudhury
(74) *Attorney, Agent, or Firm* — Sheppard Mullin Richter & Hampton LLP

(57) ABSTRACT

Techniques for dynamically managing capabilities on network monitoring devices are provided. A client application interface associated with a client device for a user to manage network capabilities on network monitoring devices may be provided. An indication of the user renting a first network capability from the client device may be received. The first network capability may be enabled on a first network monitoring device associated with the user.

16 Claims, 6 Drawing Sheets

SYSTEMS AND METHODS FOR DYNAMICALLY MANAGING CAPABILITIES ON NETWORK MONITORING DEVICES

FIELD OF THE INVENTION

The present disclosure relates to the field of communications and, more particularly, to management of network capabilities on network monitoring devices.

BACKGROUND

Many types of communication networks exist and span a vast number of technologies and protocols. For example, some networks may involve analog signals while other networks involve digital signals. Networks may be based on different transmission media, such as electrical signals and electromagnetic waves. Example networks may include, but are not limited to, computer networks, public switched telephone networks (PSTN), packet switched networks, radio networks, television networks, etc.

Networks can be monitored for myriad reasons. The monitoring of networks may involve assessments regarding the design, deployment, operation, testing, optimization, or maintenance of the networks. Network monitoring devices, which are often used by technicians, can facilitate the monitoring of networks. Conventional network monitoring devices are equipped to analyze numerous technologies and protocols implemented within networks or components within the networks.

SUMMARY

To dynamically manage capabilities on network monitoring devices, computer implemented methods, systems, and computer readable media, in an embodiment, may provide a client application interface associated with a client device for a user to manage network capabilities on network monitoring devices. An indication of the user renting a first network capability from the client device may be received. The first network capability may be enabled on a first network monitoring device associated with the user.

In an embodiment, the first network capability may be disabled on the first network monitoring device responsive to a disabling event.

In an embodiment, the first disabling event may be lapse of a rental period for the first network capability.

In an embodiment, the receiving the indication of the user renting the first network capability from the client device may include receiving an indication of a selection of the first network capability by the user from the client device.

In an embodiment, the receiving the indication of the user renting the first network capability from the client device may include receiving an indication of a selection of a rental period by the user from the client device.

In an embodiment, the receiving the indication of the user renting the first network capability from the client device may include receiving an indication of a rental payment by the user from the client device.

In an embodiment, the receiving the indication of the user renting the first network capability from the client device may include receiving an indication of an assignment of the first network capability to the first network monitoring device by the user from the client device.

In an embodiment, an indication of a removal of the assignment of the first network capability to the first network monitoring device by the user from the client device may be received. The first network capability on the first network monitoring device may be disabled.

In an embodiment, before the lapse of a rental period for the first network capability, an indication of an assignment of the first network capability to a second network monitoring device by the user from the client device may be received. The first network capability on the second network monitoring device may be enabled.

In an embodiment, the first network capability may be disabled on the second network monitoring device responsive to a disabling event.

In an embodiment, the disabling event may be lapse of the rental period for the first network capability.

In an embodiment, the client device is a device selected from a group consisting of a desktop computer, a laptop computer, a tablet, and a smartphone.

In an embodiment, the client device is the first network monitoring device.

In an embodiment, communication may be established with the first network monitoring device to enable the first network capability on the first network monitoring device.

In an embodiment, the enabling the first network capability on the first network monitoring device associated with the user may include transmitting an enabling command to the first network monitoring device to enable the first network capability on the first network monitoring device.

In an embodiment, a disable timing command may be transmitted to the first network monitoring device, the disable timing command indicating a time for the first network monitoring device to automatically disable the first network capability on the first network monitoring device.

In an embodiment, an indication of a selection of a second network capability by the user from the client device may be received. An indication of a rental payment for the second network capability by the user from the client device may be received. An indication of an assignment of the second network capability to the first network monitoring device by the user from the client device may be received. The second network capability may be enabled on the first network monitoring device. The first network capability may be disabled on the first network monitoring device in response to a first disabling event associated with the first network capability. The second network capability may be disabled on the first network monitoring device in response to a second disabling event associated with the second network capability.

In an embodiment, an indication of a selection of a second network capability by the user from the client device may be received. An indication of a rental payment for the second network capability by the user from the client device may be received. An indication of an assignment of the second network capability to a second network monitoring device by the user from the client device may be received. The second network capability may be enabled on the second network monitoring device. The first network capability may be disabled on the first network monitoring device in response to a first disabling event associated with the first network capability. The second network capability may be disabled on the second network monitoring device in response to a second disabling event associated with the second network capability.

In an embodiment, an indication of a selection of a second network capability by the user from the client device may be received. An indication of a purchase payment for the second network capability by the user from the client device may be received. An indication of an assignment of the second network capability to the first network monitoring device by the user from the client device may be received. The second network capability may be enabled on the first network monitoring device.

Many other features and embodiments of the invention will be apparent from the accompanying drawings and from the following detailed description.

Figure 1:
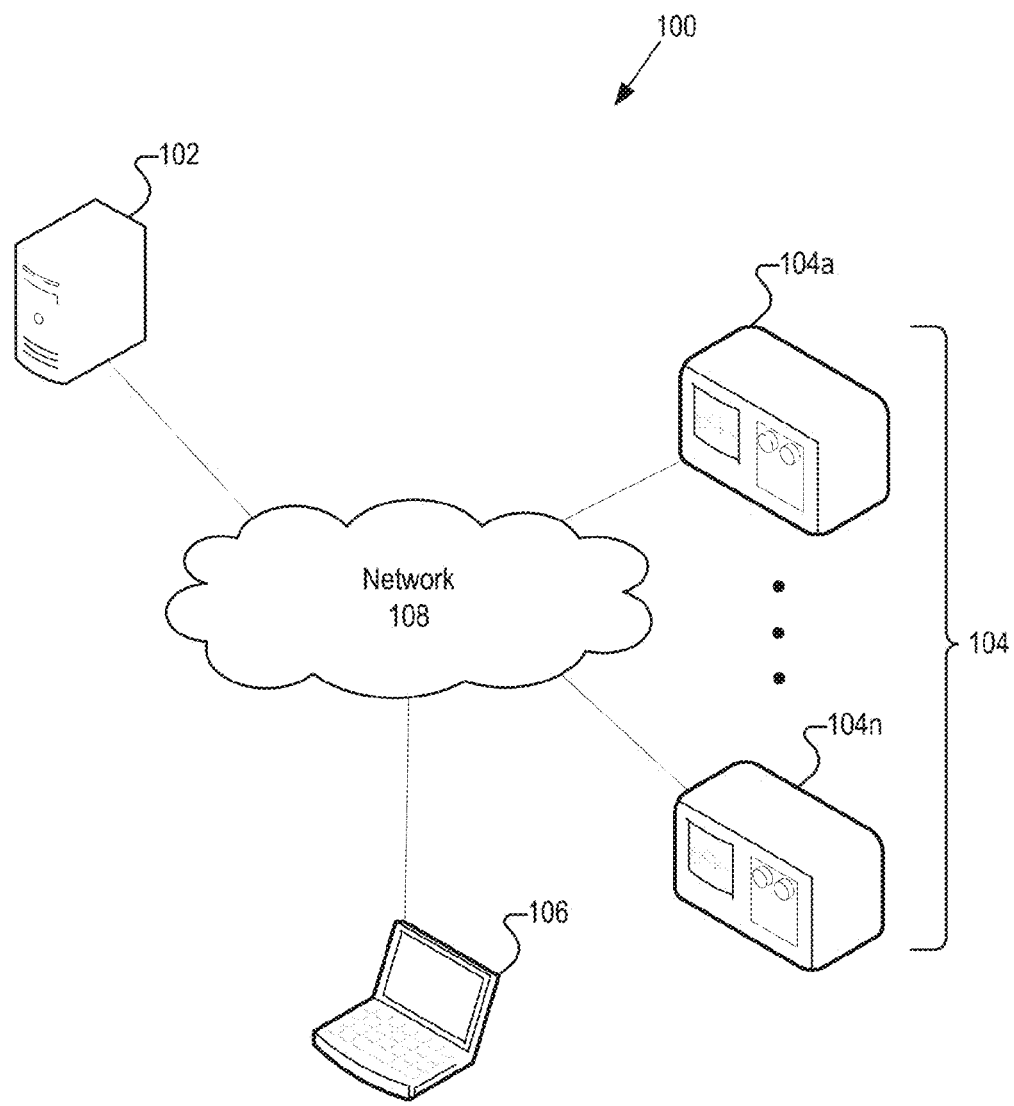
FIG. 1 illustrates an example of a system for dynamically managing network capabilities of network monitoring devices, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Dynamic Management of Network Capabilities

Network monitoring devices may be used to monitor a wide range of networks or components within the networks. The term "monitor" (or "monitoring") is used broadly herein and may include any type of testing, analyzing, diagnosing, managing, etc., of networks or components within the networks. For example, the network monitoring devices may include devices used in the design, deployment, operation, testing, optimization, or maintenance of a network. Many different types of networks may be present, such as computer networks, public switched telephone networks (PSTN), packet switched networks, radio networks, television networks, etc. Furthermore, each of these networks may include different features (or characteristics). For example, networks may have different features based on the type of transmission, such as electrical transmission, electromagnetic wave transmission, analog transmission, digital transmission, optical transmission, etc. The network capabilities needed by a network monitoring device may depend on the different network features that may be involved.

Users of the network monitoring device, such as network technicians for example, may require various network capabilities to monitor one or more networks or components within the networks. The network capabilities may depend on many different types of technologies, such as technologies related to protocols, transmission rates, etc. For example, network technicians may require network monitoring devices with the capability to monitor various transmission protocols and rates. Example transmission protocols and rates may include, but are not limited to, T-carrier transmissions (e.g., T1, T3), Synchronous Optical Networking (SONET) transmissions (e.g., OC-1, OC-3, OC-12, OC-48, OC-192), and Ethernet transmissions (e.g., gigabit Ethernet, 10 gigabit Ethernet). Each of these transmission protocols and rates, for example, may involve a different network capability to be monitored by a network monitoring device. These transmission protocols and rates are provided as examples and are not intended to be limiting. It should be appreciated that other transmission protocols and rates may be applicable.

The users' needs for each of these network capabilities may vary. For instance, a user may frequently require a network capability to monitor T-1 digital transmission lines, but less frequently require other network capabilities to monitor other transmission lines, such as T-3 digital transmission lines, OC-3 transmission lines, etc. In some instances, the differences in frequencies of need for various network capabilities may be significant. For instance, a user may require the network capability to monitor T-1 digital transmission lines about 95% of the time and the network capabilities to monitor all other digital transmission lines about 5% of the time. Despite disparities in frequencies of use, the user still may require each of the network capabilities. Therefore, the user may either buy a network monitoring device that performs all of the required network capabilities, or buy multiple network monitoring devices that variously perform all of the required network capabilities.

Both options may be very costly to the user. The user may be paying a premium price to obtain all the network capability, however only need all of those network capabilities only a minimal amount of time. Furthermore, if a user has a network monitoring device with certain network capabilities but desires to obtain additional network capabilities, then the user may have to buy additional network monitoring devices with those network capabilities. Alternatively, the user may send in the existing network monitoring device to receive a hardware and software upgrade to achieve the desired network capabilities. This may be inconvenient and leave the user without a network monitoring device for an extended period of time.

In certain embodiments, systems and methods provided herein may enable a user to individually purchase or rent network capabilities for one or more network monitoring devices. Furthermore, in certain embodiments, systems and methods provided herein may provide network monitoring devices with more than one network capability, which may each be enabled or disabled (or locked) for various periods of time. These network capabilities may be enable and disabled based on purchases and rentals of network capabilities by the user.

By selectively renting or purchasing network capabilities on an individual basis, the user may optimize access to the networking capabilities. For example, the user may purchase network capabilities that are frequently used and rent the other network capabilities that are less frequently used. This may also allow users to try different network capabilities before purchasing the network capability. By selectively renting or purchasing network capabilities, the cost to the user may be significantly reduced. For example, manufacturers or rental service providers may offer (e.g., sell) network monitoring devices at a significantly reduced rate to users and charge the users based their individual purchases or rentals of network capabilities. By doing so, the initial cost (e.g., capital expenditure) to the user may be reduced. Rental service providers may be provided flexibility in marketing and offering various bundles of network capabilities in desired combinations.

FIG. 1 illustrates an example of a system 100 for dynamically managing network capabilities on network monitoring devices (e.g., communications test equipment), according to an embodiment. The system 100 may include a server 102, network monitoring devices 104a through 104n (collectively referred to herein as "network monitoring devices 104"), a computer 106, and a network 108. The server 102, the network monitoring devices 104, and the computer 106 may communicate with one another via the network 108. The network 108 may include one or more networks, such as the Internet. The network 108 may support wired or wireless network protocols. The components shown in this figure and all figures herein are exemplary only, and other implementations may include additional, fewer, or different components. Some components may not be shown so as not to obscure relevant details.

The term "server" is used broadly herein and may include a computer system, such as one or more computers, that communicates with one or more client devices, such as the network monitoring devices 104 and the computer 106. The server 102 may include a computer system that provides dynamic management of network capabilities on the network monitoring devices 104. The server 102 may enable users to purchase or rent various network capabilities for the network monitoring devices 104. The term "users" is used broadly herein and may include customers who purchase or rent the network monitoring devices 104, customers who purchase or rent network capabilities for the network monitoring devices 104, authorized users (e.g., technicians) of the network monitoring devices 104, etc. The server 102 may maintain information related to the network capabilities, the network monitoring devices 104, and the users of the network monitoring device 104. The server 102 may track purchases and rentals of network capabilities and their assignments to the network monitoring devices 104. When the network capabilities are purchased or rented, the server 102 may enable the network capabilities on the network monitoring devices 104.

The network monitoring devices 104 may include any variety of devices used to monitor one or more networks or components within the networks. The network monitoring devices 104 may include any variety of meters, testers, analyzers, etc. The network monitoring devices 104 may implement a plurality of network capabilities that may be enabled or disabled for various periods of time. The network monitoring devices 104 may include the necessary hardware and software to use all of the network capabilities. However, the network monitoring devices 104 may be programmed to enable and disable these network capabilities on command. If a specific network capability is enabled on one of the network monitoring devices 104, then the network monitoring device 104 may operate with that network capability. When that network capability is disabled, then the network monitoring device 104 may no longer operate with that network capability.

The computer 106 may include a wide range of computing devices or systems. In various embodiments, the client device 104 may include a desktop computer, a laptop computer, a tablet computing device, a mobile phone, or any other computing device. While only a single device is shown for the computer 106, more than one device may be applicable. In certain embodiments, the computer 106 may include a client application that enables a user to dynamically manage the network capabilities of one or more of the network monitoring devices 104 from the computer 106. The client application may be a standalone application, such as a mobile application, that communicates with an interface module on the server 102. In other embodiments, the client application may be web browser that communicates with a website on the server 102. The user may also use the client application to register as a customer, register the network monitoring devices 104, register authorized users, purchase or rent network capabilities, select rental periods for the rented network capabilities, assign or reassign network capabilities to the network monitoring devices 104, disable network capabilities, etc. In certain embodiments, the computer 106 may also communicate with one or more of the network monitoring devices 104.

Figure 2:
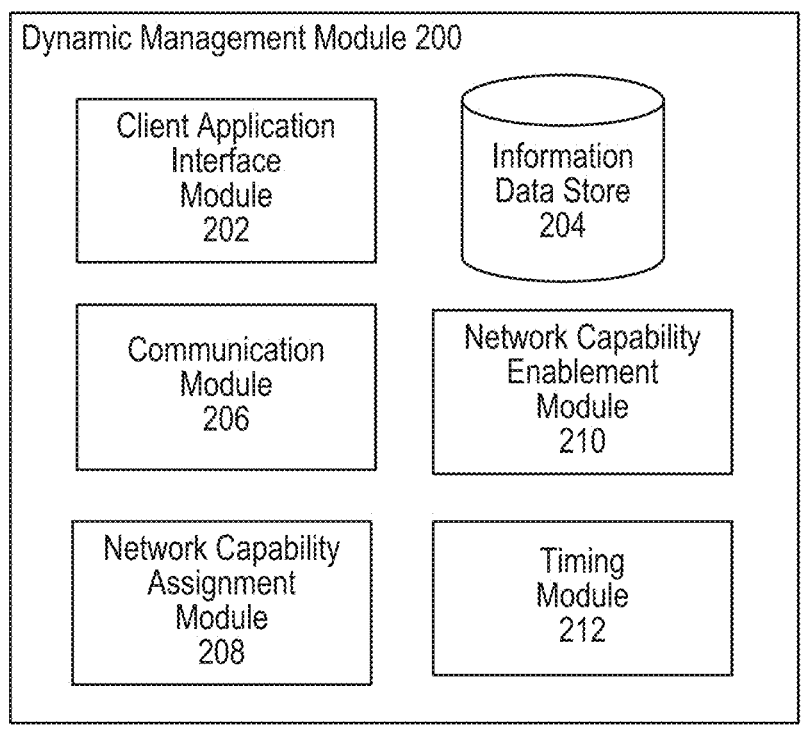
FIG. 2 illustrates an example of a dynamic management module, according to an embodiment.

FIG. 2 illustrates an example of a dynamic management module 200, according to an embodiment. In an embodiment, the server 102 may include the dynamic management module 200 to dynamically manage network capabilities on the network monitoring devices 104. The dynamic management module 200 may include a client application interface module 202, an information data store 204, a communication module 206, a network capability assignment module 208, a network capability enablement module 210, and a timing module 212.

The client application interface module 202 may provide an interface for users to dynamically manage network capabilities on the network monitoring devices 104. For example, the client application interface module 202 may include a website that users may access from a web browser on a client device (e.g., the computer 106 or the network monitoring devices 104) in order to rent, purchase, or manage network capabilities for the network monitoring devices 104. As another example, the client application interface module 202 may provide an interface that operates in conjunction with a standalone application, such as a mobile application, residing on the client device.

The information data store 204 may maintain various data related to the dynamic management of the network capabilities on the network monitoring devices 104. For example, the information data store 204 may store information related to the network capabilities, the network monitoring devices 104, or the users of the network monitoring device 104. The information data store 204 may include a database or other data storage device. The information data store 204 may include, for example, various types of persistent memory, such as Flash or other types of memory. The information data store 204 may include, or operate in conjunction with, a database management system that tracks users, the network monitoring devices 104, purchases and rentals of various network capabilities, assignments of the network capabilities to the network monitoring devices 104, login usernames and passwords, etc. Various database management systems may be implemented in different embodiments. In an embodiment, a relational database management system may be implemented.

In certain embodiments, a user may register with the dynamic management module 200 through the client application on the client device. For example, the user may be able to provide various information, such as the user's name, an associated company name, names of authorized users, etc. The user may register herself as a customer, or may register one or more of the network monitoring devices 104. Upon registration, the dynamic management module 200 may create all associated tables in the database management system.

In an embodiment, the user may provide online payments (e.g., credit card payments, PayPal payments) to purchase or rent network capabilities using the client application on the client device. In an embodiment, an associated financial account may be generated and maintained for the user. For instance, money from purchase orders may be deposited into the account. A purchase order may include, for example, a certain number of network capabilities that may be purchased or rented for a certain period of time. In an embodiment, the user may be able to deposit money into the account via an online transaction from the client application. The account may also maintain credit card information, or other online payment account information for future rentals or purchases of network capabilities. In an embodiment, the user may be able to use virtual coins (or virtual money) as payment for rentals or purchases of network capabilities.

The location of the information data store 204 may vary in different embodiments. In an embodiment, the information data store 204 may be located within the dynamic management module 200 or within the server 102 including the dynamic management module 200. In another embodiment, the information data store 204 may be located remote from the dynamic management module 200 or the server 102 including the dynamic management module 200.

The communication module 206 may establish communications with client devices, such as the network monitoring devices 104 or the computer 106. For example, the communication module 206 may send or receive various data or services related to the dynamic management of the network capabilities on the network monitoring devices 104. The communication module 206 may include, for example, a wired or wireless transceiver using any variety of transmission protocols.

The network capability assignment module 208 may track assignments of network capabilities to the network monitoring devices 104. In certain embodiments, the client application may enable the user to assign network capabilities to the network monitoring devices 104 that are associated with the user. Once a network capability is purchased or rented by the user, the user may assign the network capability to one or more of the network monitoring devices 104. For example, a user may access a website providing a graphical user interface (GUI) to rent a network capability and to assign it to one or more of the network monitoring devices 104 that are associated (e.g., registered) with the user. In certain embodiments, a network capability may be shared (or floated) between multiple network monitoring devices 104 associated with the user. For instance, the user may assign a network capability among a plurality of network monitoring devices 104 associated with the user. If the network capability is rented for a rental period, then the user may have the ability to assign the network capability among the network monitoring devices 104 during the rental period. In an embodiment, a network capability may be assigned to only one network monitoring device 104 at a time. In another embodiment, a network capability may be assigned to more than one network monitoring device 104 at a time. For instance, a rental service provider may provide an option where a network capability may be available for more than one of the network monitoring devices 104 at a time.

The network capability enablement module 210 may enable network capabilities on the network monitoring devices 104. For example, the network capability enablement module 210 may transmit an enabling command (or instruction) to an appropriate network monitoring device 104 for a purchased or rented network capability. The enabling command may be transmitted after communication has been established with the network monitoring device 104. When the network monitoring device 104 has received the enabling command, the network capability may be enabled on the network monitoring device 104.

The network capability enablement module 210 may disable network capabilities on the network monitoring devices 104, such as after the occurrence of a disabling event. A disabling event may include, for example, a lapse of a rental period for a network capability, or a removal of an assignment of the network capability from a network monitoring device 104. The assignment may be removed to disable the network capability from the network monitoring device 104 or to reassign the network capability to another network monitoring device 104. When the disabling event occurs, the network capability enablement module 210 may transmit the disabling command upon to the appropriate network monitoring device 104 when communication has been established.

The timing module 212 may track the timing of rental periods associated with the renting of network capabilities. For example, once a user rents a network capability for a rental period, the timing module 212 may identify the length of the rental period, which may include the starting and ending times of the rental period. In some instances, the rental period may begin at the time the network capability was rented, such as at the time of payment for the rental. In other instances, the rental period may begin at a future time, such as a selected date or time by the user. When the starting time is reached, the timing module 212 may indicate to the network capability enablement module 210 to enable the network capability.

Various sizes of rental periods may be implemented in different embodiments. Example rental periods may include any variety of days (e.g., 1 day, 2 days, etc.), months (e.g., 1 month, 2 months, etc.), years, or any other period of time. In an embodiment, the timing module 212 may include a clock to track when a rental period begins and ends. For instance, a rental period for 24 hours beginning at 1:00 pm may end when the clock indicates 1:00 pm on the following day. In another embodiment, the timing module 212 may include a timer to countdown the time of the rental period. For instance, the timer may be activated at the beginning of the rental period. Once the rental period has elapsed, the timing module 212 may indicate to the network capability enablement module 210 to disable the network capability.

In an embodiment, the timing module 212 may transmit a disable timing command to the network monitoring devices 104. The disable timing command may indicate a time for a network monitoring device 104 to automatically disable a network capability without the need for communication to be established between the server 102 and the network monitoring device 104. The disable timing command may include, for example, information related to the rental period that may identify when the rental period is over, such as the length of the rental period and any associated start time of the rental period. In this way, the network capability may be disabled by the network monitoring device 104 even if the network monitoring device 104 is offline, such as when no communication established with the server 102. In an embodiment, the disable timing command for a specific network capability may be transmitted with the enabling command for the network capability. In an embodiment, the server may show the network capability to the user as unavailable until the network monitoring device 104 is back online and releases the network capability for reassignment.

Figure 3:
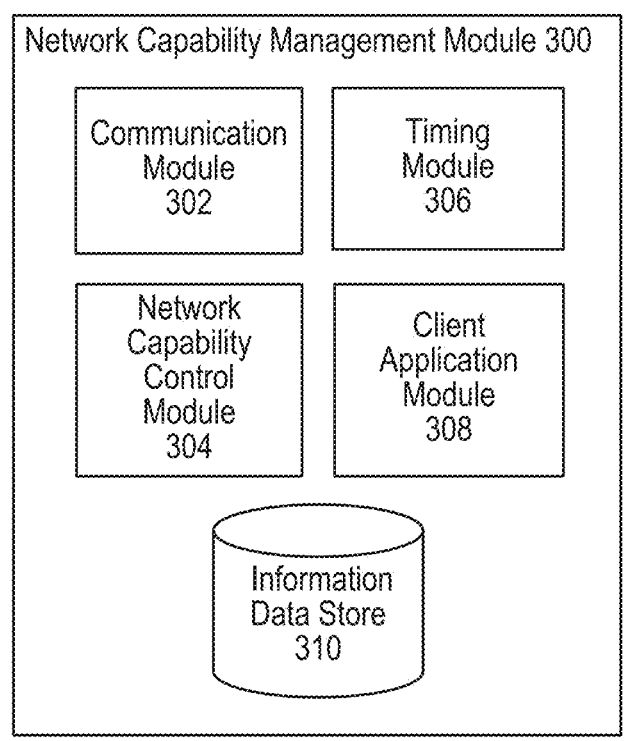
FIG. 3 illustrates an example of a network capability management module, according to an embodiment.

FIG. 3 illustrates an example of a network capability management module 300, according to an embodiment. In an embodiment, the network monitoring devices 104 may include the network capability management module 300 to dynamically manage the network capabilities on the network monitoring devices 104. The network capability management module 300 may include a communication module 302, a network capability control module 304, a timing module 306, a client application module 308, and an information data store 310.

The communication module 302 may establish communication with the server 102. The communication module 302 may send or receive various data or services related to the renting, purchasing, and managing of network capabilities on the network monitoring devices 104. The communication module 302 may include, for example, a wired or wireless transceiver using any variety of transmission protocols. In an embodiment, the communication module 302 may also establish communication with the computer 106.

The network capability control module 304 may enable and disable various network capabilities on the network monitoring device 104. For example, once communication is established with the server 102, the network capability control module 304 may receive an enabling command from the server 102 for a networking capability that has been purchased or rented by the user. Once the enabling command is received, the network capability control module 304 may enable the corresponding network capability on the network monitoring device 104. In an embodiment, the network capability control module 304 may receive a disabling command from the server 102 for a networking capability that is currently enabled on the network monitoring device 104. Once the disabling command is received, the network capability control module 304 may disable the corresponding network capability on the network monitoring device 104.

The timing module 306 may track the timing of rental periods associated with the renting of network capabilities. At the lapse of the rental period, the timing module 306 may indicate to the networking capability control module 306 to disable the network capability associated with the elapsed rental period. Therefore, even if communication is no longer established between the network monitoring device 104 and the server 102, the timing module 306 and the network capability control module 304 may track the rental period and disable the network capability at the lapse of the rental period. In an embodiment, the timing module 306 may receive a disable timing command from the timing module 212 on the server 102. The disable timing command may indicate a time for a network monitoring device 104 to automatically disable a network capability without the need for communication to be established between the server 102 and the network monitoring device 104. The disable timing command may include, for example, information related to the rental period that may identify when the rental period is over, such as the length of the rental period and any associated start time of the rental period.

In an embodiment, the timing module 306 may include a clock that may not be adjustable by the user. This clock may be different than a system clock on the network monitoring devices 104, which may be adjusted by the user. The clock of the timing module 306 may be locked from the user or otherwise inaccessible to the user. In this way, the user may not tamper with the rental period. In an embodiment, the clock of the timing module 306 may be a "delta" clock or timer that counts down the remaining time in the rental period once the rental period has begun. In an embodiment, the rental period may begin when the enabling command is received from the server 102. In an embodiment, the timing module 306 may wait for a starting time to be reached before tracking the rental period. The enablement of the network capability may be put on hold until the rental period begins.

When the rental period begins, the timing module 306 may indicate to the network capability control module 304 to enable the network capability.

The client application module 308 may provide a client application to interface with the client application interface module 202 on the dynamic management module 200 to send data to or receive data from the dynamic management module 200. In an embodiment, the client application module 308 may provide a graphical user interface on the network monitoring device 104 for the user to rent, purchase, or manage the network capabilities of the network monitoring device 104. For example, the client application module 308 may include a web browser that is used to access a rental management website provided by the server 102. In an embodiment, the client application module 308 may include a standalone application, such as a mobile application, that is run on the network monitoring device 104 but which interfaces with the client application interface module 202 when a connection between the server 102 and the network monitoring device 104 is established. The client application module 308 may operate offline until communication is established between the server 102 and the network monitoring device 104, at which time the client application module 308 may synchronize with the dynamic management module 200. In another embodiment, the ability to rent, purchase, or manage the network capabilities of the network monitoring device 104 may not be performed using the network monitoring device 104, but rather must be performed using a similar client application on the computer 106.

The information data store 310 may maintain various information related to the network monitoring device 104. The information may include identifying information, such as a serial number or other unique identifier, for the network monitoring device 104. The identifying information may be communicated to the server 102 during a registration process for the network monitoring device 104. The information data store 310 may also include other information, such as a list of authorized users of the network monitoring device 104, or data (e.g., measurements) obtained during operation of the network monitoring device 104. The information data store 310 also may maintain records regarding the network capabilities that are accessible by the network monitoring device 104. For example, the records may reflect the network capabilities that have been purchased or rented for use by the network monitoring device 104. Further, the records may reflect the rental periods for rented network capabilities, usage and related timing of the network capabilities, and the receipt of enabling commands and disabling commands.

Figure 4:
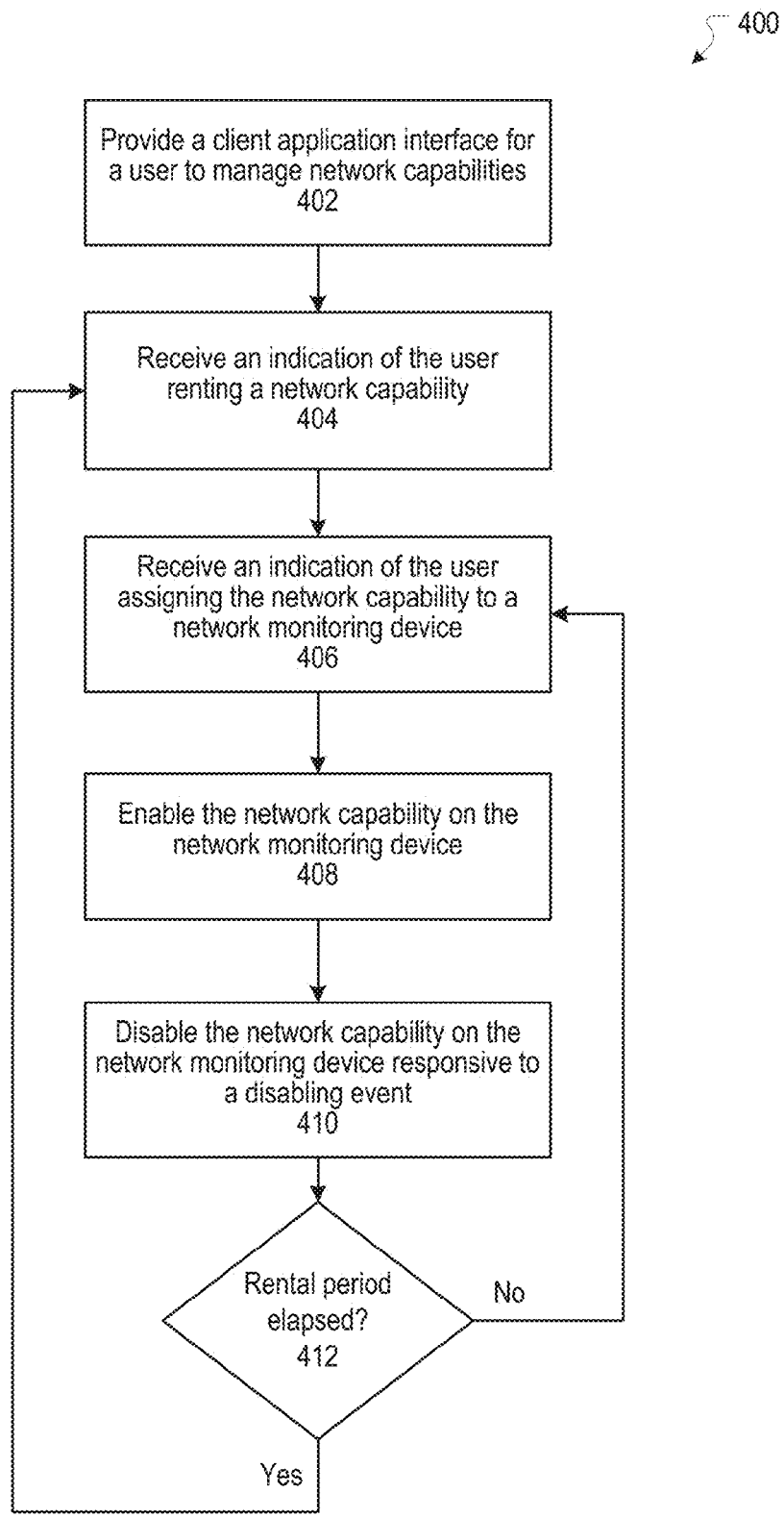
FIG. 4 illustrates a flowchart of an example method for dynamically managing network capabilities of network monitoring devices, according to an embodiment.

FIG. 4 illustrates a flowchart of an example method for dynamically managing network capabilities on network monitoring devices 104, according to an embodiment. At block 402 of method 400, a client application interface is provided for a user to manage network capabilities on one or more network monitoring devices 104 associated (e.g., registered) with the user. The client application interface may reside on a server and allow a user to register as a customer, register the network monitoring devices 104, register authorized users, purchase or rent network capabilities, assign or reassign network capabilities to the network monitoring devices 104, and enable or disable network capabilities from a client application on a client device, such as the computer 106 for instance At block 404, an indication of the user renting a network capability from the client device is received. For example, the user may use a web browser from the client device (e.g., laptop computer, desktop computer, smartphone, or tablet computing device) to access a website hosted on the server. From the website, the user may select one or more network capabilities to rent. In another embodiment, the user may run a standalone application, such as a mobile application, on the client device to communicate with a dynamic management module 200 on the server. From the standalone application, the user may select the network capabilities to rent. Various forms of payment may be implemented in different embodiments. In an embodiment, the user may complete an online payment transaction using the website or standalone application. In an embodiment, blocks 402 and 404 may be performed by the client application interface module 202 of FIG. 2.

At block 406, an indication of the user assigning the network capability to a network monitoring device 104 may be received. For example, the user may have one or more network monitoring devices 104 registered with the dynamic management module 200. Using the client application on the client device, the user may then select which network monitoring device 104 to assign the rented network capability. In an embodiment, block 406 may be performed by the network capability assignment module 208 of FIG. 2.

At block 408, the network capability may be enabled on the network monitoring device 104. Communication may be established between the server and the network monitoring device 104. An enabling command may then be transmitted to the network monitoring device 104 to enable the network capability on the network monitoring device 104. In an embodiment, block 408 may be performed by the communication module 206 and the network capability enablement module 210 of FIG. 2.

At block 410, the network capability may be disabled on the network monitoring device 104 when a disabling event is detected. An example of a disabling event may include when a user removes the assignment of the network capability to the network monitoring device 104. For instance, the user may assign the network capability to another network monitoring device 104. Another example of a disabling event may include the lapse of the rental period. After the lapse of the rental period, the network capability may be disabled on the network monitoring device 104. The assignment of the network capability may then be removed from the network monitoring device 104.

At block 412, a determination is made as to whether the rental period has elapsed. If the rental period has not elapsed, then the user may have the option to assign the network capability to the same or different network monitoring device 104. If the user chooses to assign the network capability to another network monitoring device 104, then blocks 406 through 412 may be repeated for the assigned network monitoring device 104, as represented by the arrow from block 412 to block 406. If at block 412 the rental period has elapsed, then the network capability may remain disabled, and the process may be repeated upon receipt of an indication that another network capability is rented or purchased. In an embodiment, blocks 410 and 412 may be performed by the network capability enablement module 210 and the timing module 212 of FIG. 2.

For purchased network capabilities, blocks 404 through 408 may be similarly applied. For example, an indication of the user purchasing the network capability may be received. An indication of the user assigning the network capability to a network monitoring device 104 may be received. The network capability may then be enabled on the network monitoring device 104. As the network capability was purchased, the disabling of the network capability on the network monitoring device 104 (e.g., as represented by blocks 410 and 412) may not be applicable. In an embodiment, the user may be able to defer enablement of a purchased or rented network capability until the user elects to enable the network capability.

Figure 5:
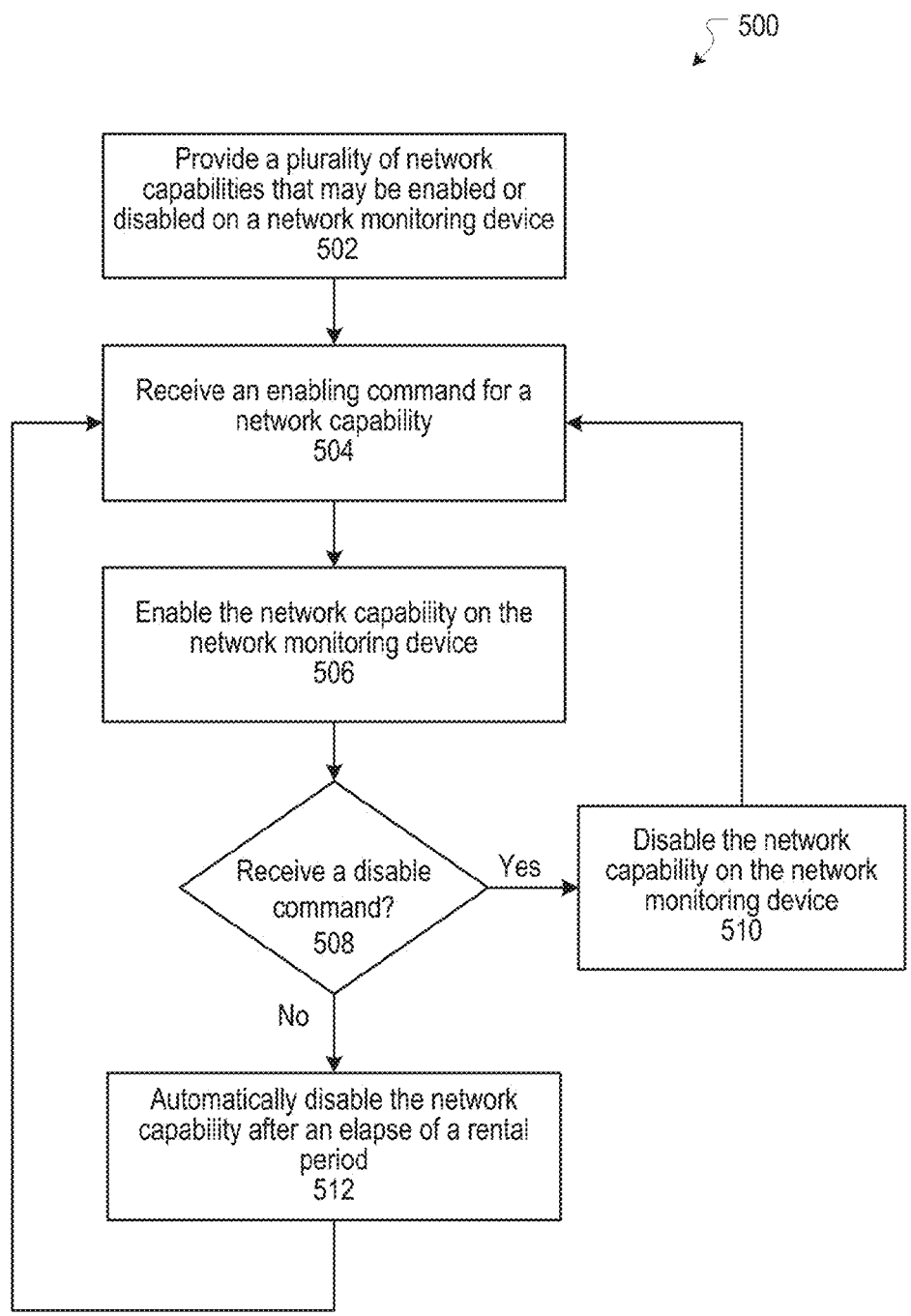
FIG. 5 illustrates a flowchart of an example method for dynamically managing network capabilities of a network monitoring device, according to an embodiment.

FIG. 5 illustrates a flowchart of an example method for dynamically managing network capabilities on a network monitoring device 104, according to an embodiment. At block 502 of method 500, a plurality of network capabilities may be provided on a network monitoring device 104. For example, the network monitoring device 104 may have hardware and software for each of the plurality of network capabilities. The plurality of network capabilities may be capable of being enabled or disabled on the network monitoring device 104. In an embodiment, block 502 may be performed by the network capability control module 304 of FIG. 2.

At block 504, an enabling command for a network capability may be received. For example, the network monitoring device 104 may receive an enabling command from the server 102 including a dynamic management module, such as described herein. In an embodiment, block 504 may be performed by the communication module 302 of FIG. 2.

At block 506, the network capability on the network monitoring device 104 may be enabled in response to receiving the enabling command. At block 508, detection for a disabling command is performed. At block 510, if a disabling command is received, then the network capability on the network monitoring device 104 is disabled. Once the network capability is disabled, the network monitoring device 104 may wait to receive any additional enabling commands for the same or different network capability, as represented by the arrow from block 510 to block 504.

At block 512, if a disabling command is not received, then the network capability may be automatically disabled after lapse of the rental period for a rented network capability without the need for communication to be established with the server 102. For example, a disable timing command, such as described herein, may include information about the rental period (e.g., length of the rental period) and may have been previously transmitted from the server 102 to the network monitoring device 104. At the lapse of the rental period as identified by the disable timing command, the network capability may be automatically disabled. Once the network capability is disabled, the network monitoring device 104 may wait to receive any additional enabling commands for the same or different network capability, as represented by the arrow from block 512 to block 504. In an embodiment, blocks 506, 508, 510, and 512 may be performed by the network capability control module 304 and the timing module 306 of FIG. 2.

Hardware Implementation

Figure 6:
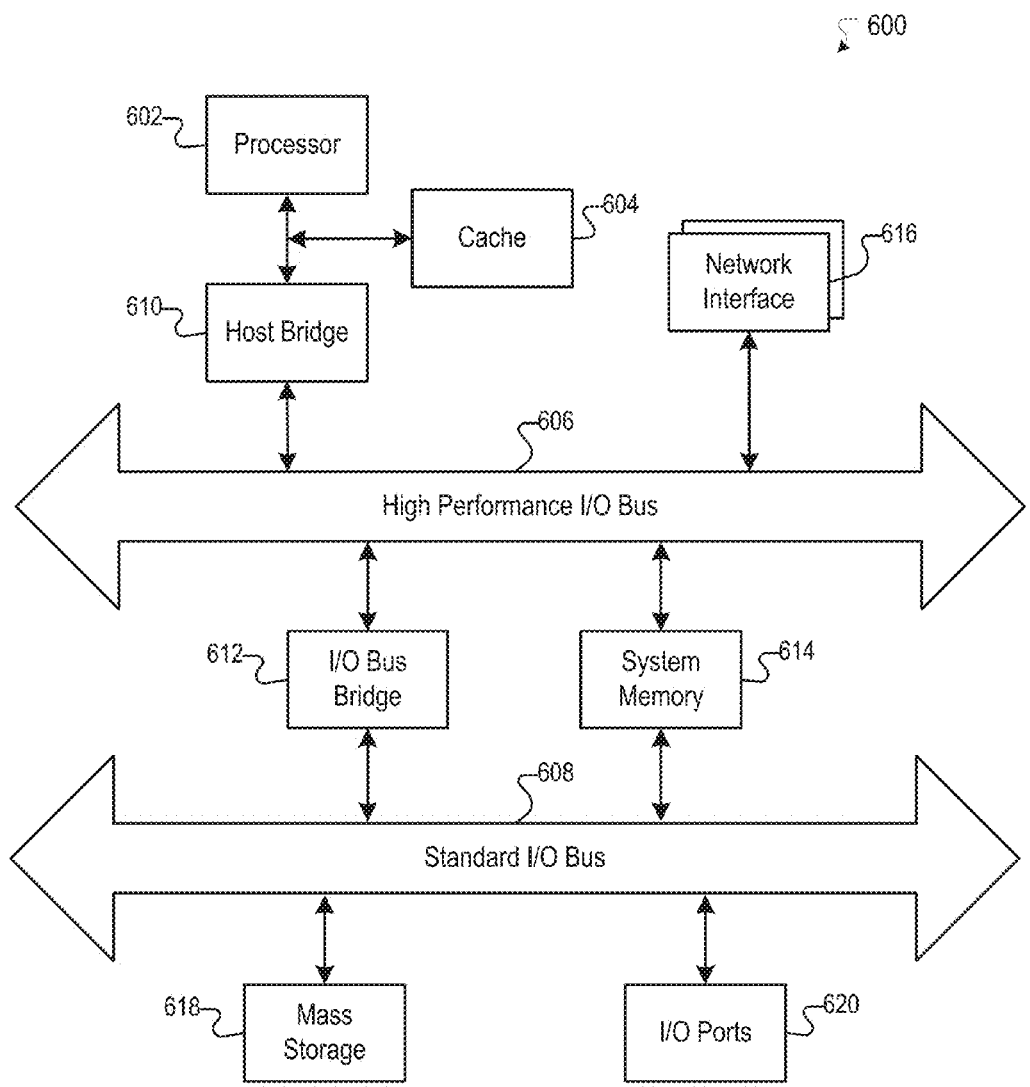
FIG. 6 illustrates an example of a computer system that may be used to implement one or more of the embodiments described herein, according to an embodiment.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the server 102, the network monitoring devices 104, the computer 106, or a component thereof. In an embodiment of the invention, the computer system 600 may be one computer among many that constitutes all or part of the system 100 for dynamically managing network capabilities on network monitoring devices 104.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
   providing, by a computer system, a client application interface configured for a user to manage a plurality of network capabilities on a network monitoring device, wherein each network capability of the plurality of network capabilities is associated with a particular transmission protocol;
   receiving, by the computer system, a first indication of the user renting a first network capability of the plurality of network capabilities, the first network capability associated with a first transmission protocol;
   in response to the first indication, enabling, by the computer system, the first network capability on the network monitoring device, wherein the enabling the first network capability on the network monitoring device allows the user to use the network monitoring device to monitor transmission lines that utilize the first transmission protocol;
   receiving, by the computer system, a second indication that the user is no longer renting the first network capability;
   in response to the second indication, disabling, by the computer system, the first network capability on the network monitoring device, wherein the disabling the first network capability on the network monitoring device prohibits the user from using the network monitoring device to monitor transmission lines that utilize the first transmission protocol;
   receiving, by the computer system, a third indication that the user is renting a second network capability of the plurality of network capabilities, the second network capability associated with a second transmission protocol; and
   in response to the third indication, enabling, by the computer system, the second network capability on the network monitoring device, wherein the enabling the second network capability on the network monitoring device allows the user to use the network monitoring device to monitor transmission lines that utilize the second transmission protocol,
   wherein at least some of the plurality of network capabilities are associated with one or more T-carrier transmission protocols, one or more Synchronous Optical Networking transmission protocols, and one or more Ethernet transmission protocols.

2. The computer implemented method of claim 1, further comprising:
   receiving a fourth indication that the user is no longer renting the second network capability;
   in response to the fourth indication, disabling the second network capability on the network monitoring device, wherein the disabling the second network capability on the network monitoring device prohibits the user from using the network monitoring device to monitor transmission lines that utilize the second transmission protocol.

3. The computer implemented method of claim 2, wherein the fourth indication is received in response to a lapse of a rental period for the second network capability.

4. The computer implemented method of claim 1, wherein the receiving the first indication of the user renting the first network capability comprises:
   receiving an indication of a selection of the first network capability by the user via the client application interface.

5. The computer implemented method of claim 1, wherein the receiving the first indication of the user renting the first network capability comprises:
   receiving an indication of a selection of a rental period by the user via the client application interface.

6. The computer implemented method of claim 1, wherein the receiving the first indication of the user renting the first network capability comprises:
   receiving an indication of a rental payment by the user via the client application interface.

7. The computer implemented method of claim 1, wherein the receiving the first indication of the user renting the first network capability comprises:
   receiving an indication of an assignment of the first network capability to the network monitoring device by the user via the client application interface.

8. The computer implemented method of claim 7, further comprising:
   receiving, before the lapse of a rental period for the first network capability, an indication of an assignment of the first network capability to a second network monitoring device; and
   enabling the first network capability on the second network monitoring device, wherein the enabling the first network capability on the second network monitoring device allows the second network monitoring device to monitor transmission lines that utilize the first transmission protocol.

9. The computer implemented method of claim 8, further comprising:
   disabling the first network capability on the second network monitoring device responsive to a disabling event, wherein
       the disabling the first network capability on the second network monitoring device disallows the second network monitoring device from transmission lines that utilize the first transmission protocol.

10. The computer implemented method of claim 9, wherein the disabling event is a lapse of the rental period for the first network capability.

11. The computer implemented method of claim 1, further comprising:
establishing communication with the network monitoring device to enable the first network capability on the network monitoring device.

12. The computer implemented method of claim 11, wherein the enabling the first network capability on the network monitoring device comprises:
transmitting an enabling command to the network monitoring device to enable the first network capability on the network monitoring device.

13. The computer implemented method of claim 11, further comprising:
transmitting a disable timing command to the network monitoring device, the disable timing command indicating a time for the network monitoring device to automatically disable the first network capability on the network monitoring device.

14. The computer implemented method of claim 1, further comprising:
receiving a fourth indication of a selection of a third network capability by the user, the third network capability associated with a third transmission protocol;
receiving an indication of a purchase payment for the third network capability by the user;
receiving an indication of an assignment of the third network capability to the network monitoring device by the user from the client device; and
enabling the third network capability on the network monitoring device, wherein the enabling the third network capability allows the network monitoring device to monitor transmission lines that utilize the third transmission protocol, and further wherein
rental of the first network capability and the second network capability enables the user to use the network monitoring device to monitor transmission lines that utilize the first transmission protocol and the second transmission protocol for a pre-determined period of time, and
purchase of the third network capability enables the user to use the network monitoring device to monitor transmission lines that utilize the third transmission protocol for an indefinite period of time.

15. A system comprising:
at least one processor; and
a memory storing instructions configured to instruct the at least one processor to cause a computer system to perform a method comprising:
providing, by the computer system, a client application interface configured for a user to manage a plurality of network capabilities on a network monitoring device, wherein each network capability of the plurality of network capabilities is associated with a particular transmission protocol;
receiving, by the computer system, a first indication of the user renting a first network capability of the plurality of network capabilities, the first network capability associated with a first transmission protocol;
in response to the first indication, enabling, by the computer system, the first network capability on the network monitoring device, wherein the enabling the first network capability on the network monitoring device allows the user to use the network monitoring device to monitor transmission lines that utilize the first transmission protocol;
receiving, by the computer system, a second indication that the user is no longer renting the first network capability;
in response to the second indication, disabling, by the computer system, the first network capability on the network monitoring device, wherein the disabling the first network capability on the network monitoring device prohibits the user from using the network monitoring device to monitor transmission lines that utilize the first transmission protocol;
receiving, by the computer system, a third indication that the user is renting a second network capability of the plurality of network capabilities, the second network capability associated with a second transmission protocol; and
in response to the third indication, enabling, by the computer system, the second network capability on the network monitoring device, wherein the enabling the second network capability on the network monitoring device allows the user to use the network monitoring device to monitor transmission lines that utilize the second transmission protocol,
wherein at least some of the plurality of network capabilities are associated with one or more T-carrier transmission protocols, one or more Synchronous Optical Networking transmission protocols, and one or more Ethernet transmission protocols.

16. A non-transitory computer readable storage medium storing computer-executable instructions that, when executed, cause a computer system to perform a computer-implemented method comprising:
providing, by the computer system, a client application interface configured for a user to manage a plurality of network capabilities on a network monitoring device, wherein each network capability of the plurality of network capabilities is associated with a particular transmission protocol;
receiving, by the computer system, a first indication of the user renting a first network capability of the plurality of network capabilities, the first network capability associated with a first transmission protocol;
in response to the first indication, enabling, by the computer system, the first network capability on the network monitoring device, wherein the enabling the first network capability on the network monitoring device allows the user to use the network monitoring device to monitor transmission lines that utilize the first transmission protocol;
receiving, by the computer system, a second indication that the user is no longer renting the first network capability;
in response to the second indication, disabling, by the computer system, the first network capability on the network monitoring device, wherein the disabling the first network capability on the network monitoring device prohibits the user from using the network monitoring device to monitor transmission lines that utilize the first transmission protocol;
receiving, by the computer system, a third indication that the user is renting a second network capability of the plurality of network capabilities, the second network capability associated with a second transmission protocol; and in response to the third indication, enabling, by the computer system, the second network capability on the network monitoring device, wherein the enabling the second network capability on the network monitoring device allows the user to use the network monitoring device to monitor transmission lines that utilize the second transmission protocol, wherein at least some of the plurality of network capabilities are associated with one or more T-carrier transmission protocols, one or more Synchronous Optical Networking transmission protocols, and one or more Ethernet transmission protocols.

* * * * *